US007616625B1

(12) United States Patent
Un et al.

(10) Patent No.: US 7,616,625 B1
(45) Date of Patent: Nov. 10, 2009

(54) SYSTEM AND METHOD FOR SELECTIVE ENHANCED DATA CONNECTIONS IN AN ASYMMETRICALLY ROUTED NETWORK

(75) Inventors: Dararith Un, Derwood, MD (US); Orin P. Reams, III, Charles Town, WV (US); Robert M. Poole, Leesburg, VA (US); Carl James Gray, Sr., Leesburg, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 847 days.

(21) Appl. No.: 10/689,690

(22) Filed: Oct. 22, 2003

(51) Int. Cl.
*H04L 12/66* (2006.01)

(52) U.S. Cl. .............. 370/353; 370/247; 370/251; 370/354; 370/469; 370/463

(58) Field of Classification Search .............. 370/409, 370/230, 395.52, 395.53, 401, 352, 356, 370/397, 251, 252, 247, 353, 354, 463, 469; 709/229, 219
See application file for complete search history.

(56) References Cited

U.S. PATENT DOCUMENTS

| 5,930,258 | A  | * | 7/1999  | Dato Solis et al. | 370/401 |
|-----------|----|---|---------|-------------------|---------|
| 6,118,785 | A  | * | 9/2000  | Araujo et al.     | 370/401 |
| 6,226,751 | B1 | * | 5/2001  | Arrow et al.      | 726/15  |
| 6,295,293 | B1 | * | 9/2001  | Tonnby et al.     | 370/389 |
| 6,426,950 | B1 | * | 7/2002  | Mistry            | 370/352 |
| 6,487,598 | B1 | * | 11/2002 | Valencia          | 709/227 |
| 6,614,809 | B1 | * | 9/2003  | Verma et al.      | 370/469 |
| 6,772,226 | B1 | * | 8/2004  | Bommareddy et al. | 709/245 |
| 6,985,935 | B1 | * | 1/2006  | Zhang et al.      | 709/219 |
| 7,117,530 | B1 | * | 10/2006 | Lin               | 726/15  |
| 2003/0078996 | A1 | * | 4/2003 | Baldwin          | 709/220 |
| 2003/0149746 | A1 | * | 8/2003 | Baldwin et al.   | 709/219 |
| 2003/0163577 | A1 | * | 8/2003 | Moon et al.      | 709/229 |

* cited by examiner

*Primary Examiner*—Ricky Ngo
*Assistant Examiner*—Dewanda Samuel

(57) ABSTRACT

A system and method for enhanced data connections via an asymmetric data network receives incoming modem calls and discriminates those intended for enhanced service Web or other service, for instance by domain name. Those calls destined for that type of enhanced treatment may be received via modem banks or other RAS resources communicating with the PSTN or otherwise, and directed to an enhancement cluster or other nodes or locations for compression, caching, optimization or other processing designed to give the user's Web browsing or other service an improved or more responsive feel. According to embodiments of the invention in one regard, the user IP sessions may be tunneled to the enhancement cluster using a tunneling protocol, such as Layer 2 Tunneling Protocol (L2TP) or others. According to such protocols, the user's IP datagrams may be transparently embedded into larger packets which pass as point-to-point protocol (PPP) data, so that virtual direct connections to the enhancement cluster and then to Web or others sites may be established. All user data flows through the enhancement cluster in both directions, and may be compressed, for instance at ratios of up to 5:1 or more. Caching, security and other features may likewise be applied to the data stream, resulting in a more responsive and feature-rich service for end users.

55 Claims, 6 Drawing Sheets

| 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| T | L | O | O | S | O | Q | P | 0 | 0 | 0 | 0 | Version | | | | Length | | | | | | | | | | | | | | | |
| Tunnel ID | | | | | | | | | | | | | | | | Session ID | | | | | | | | | | | | | | | |
| Ns | | | | | | | | | | | | | | | | Nr | | | | | | | | | | | | | | | |
| Offset Size | | | | | | | | | | | | | | | | Offset Pad ::: | | | | | | | | | | | | | | | |
| Data ::: | | | | | | | | | | | | | | | | | | | | | | | | | | | | | | | |

FIG. 4

SYSTEM AND METHOD FOR SELECTIVE ENHANCED DATA CONNECTIONS IN AN ASYMMETRICALLY ROUTED NETWORK

FIELD OF THE INVENTION

The invention relates to the field of communications, and more particularly to platforms and techniques for establishing enhanced dial-up connections to the Internet or other networks, such as connections having added compression, caching, optimization, and security or other services.

BACKGROUND OF THE INVENTION

While broadband technologies such as cable modem, digital subscriber line (DSL) and others have enjoyed market growth, a significant proportion of consumers still rely upon dial-up connections over the public switched telephone network (PSTN) to access the Internet and other networks. Dial-up modem connections retain the advantages of low cost, standardized hardware and protocols, near-universal accessibility and throughput that remains sufficient for many desired services, including email, instant messaging and others.

Commercial Internet Service Providers (ISPs) and others have therefore continued to solicit and provision dial-up users. The provisioning of dial-up service may involve deploying dial-up paths which direct the user's incoming modem call to the provider via a dedicated point-to-point protocol (PPP) connection. As illustrated in FIG. 1, this may conventionally involve receiving incoming calls over the PSTN via the local switch of a local exchange carrier or other telephone service provider. The dial-up modem call may be received in a modem bank, remote access server (RSA) or other terminal equipment which synchronizes with the consumer's modem while password, username or other information is authenticated.

Once connected into the data transport network, the user's call may be routed by domain name, IP address or other data for delivery to an associated Web site or other destination. However, this type of hardware provisioning for dial-up service has disadvantages.

For one, those consumers who continue to rely upon dial-up connections for access to the Internet and other networks may still desire faster upload and download times, as well as improved overall responsiveness in their browsing experience. Companies deploying PPP dial-up access could, and some commercially may, introduce compression servers or other enhancements in the data path toward that purpose. However, since the transport layer employed is point-to-point, in general the dial-up lines and their associated servers and routers must be dedicated to the individual Internet service providers providing the service. Various telephone numbers for modem access to a provider may for instance all be forced to the same data path.

Hardwiring the network edge for specific providers also limits the flexibility of the deployer, owner or operator of that hardware, since no reuse or multiplexing is practical or possible. This among other things makes the cost or amortization of that equipment greater, since it can not be shared among providers or others. Other problems exist.

SUMMARY OF THE INVENTION

The invention overcoming these and other problems in the art relates in one regard to a system and method for enhanced data connections via a telephone network, including a front-end facility for receiving modem or other calls over public switched telephone trunks. Modem calls originally configured to request and receive PPP-type connections to a given service provider may be identified by domain name or other identifiers, and injected into a virtual private network or tunnel which connects the call to an enhancement cluster which mediates the user's access to the Internet or other networks. The enhancement cluster may contain engines to perform compression, caching, optimization, and security and other processing on the user's upstream and downstream data. The data packets may be encapsulated in a higher-level tunneling protocol, so that the transmitted data may still assume that PPP-type transport is being used. In this manner, dial-site owners or operators may allow end users to make use of the asymmetric data network to establish virtual point-to-point connections with providers offering transparent compression, caching, optimization, and security or other enhanced services to end users.

BRIEF DESCRIPTION OF THE DRAWINGS

The invention will be described with reference to the accompanying drawings, in which like numbers reference like elements.

FIG. 4 illustrates an example format of a tunneling protocol.

DETAILED DESCRIPTION OF EMBODIMENTS

Figure 1:
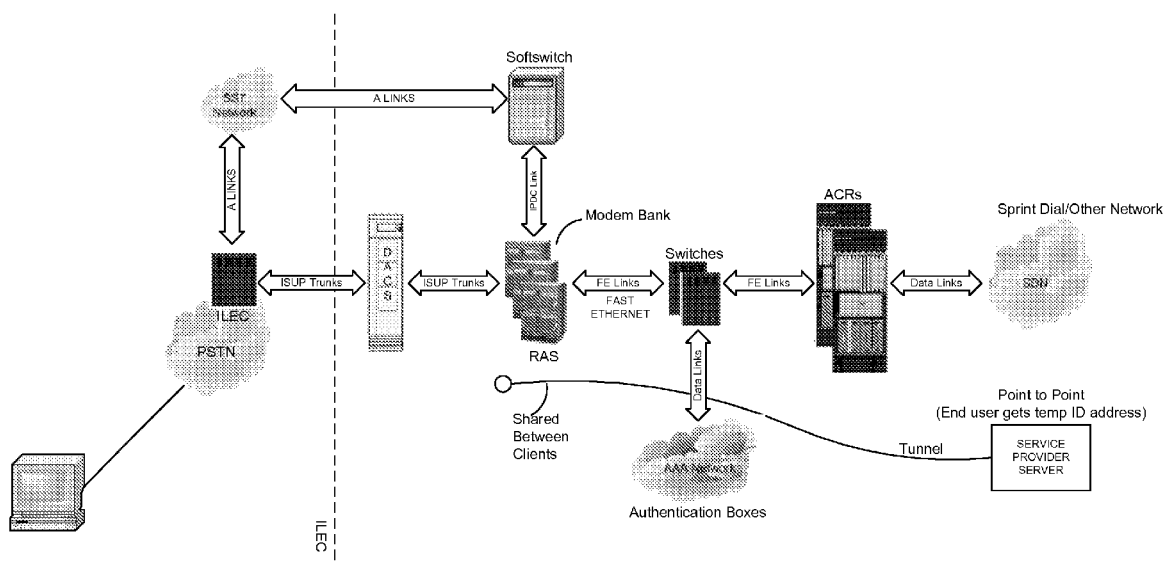
FIG. 1 illustrates a dial-up access network, according to a conventional embodiment.
Figure 2:
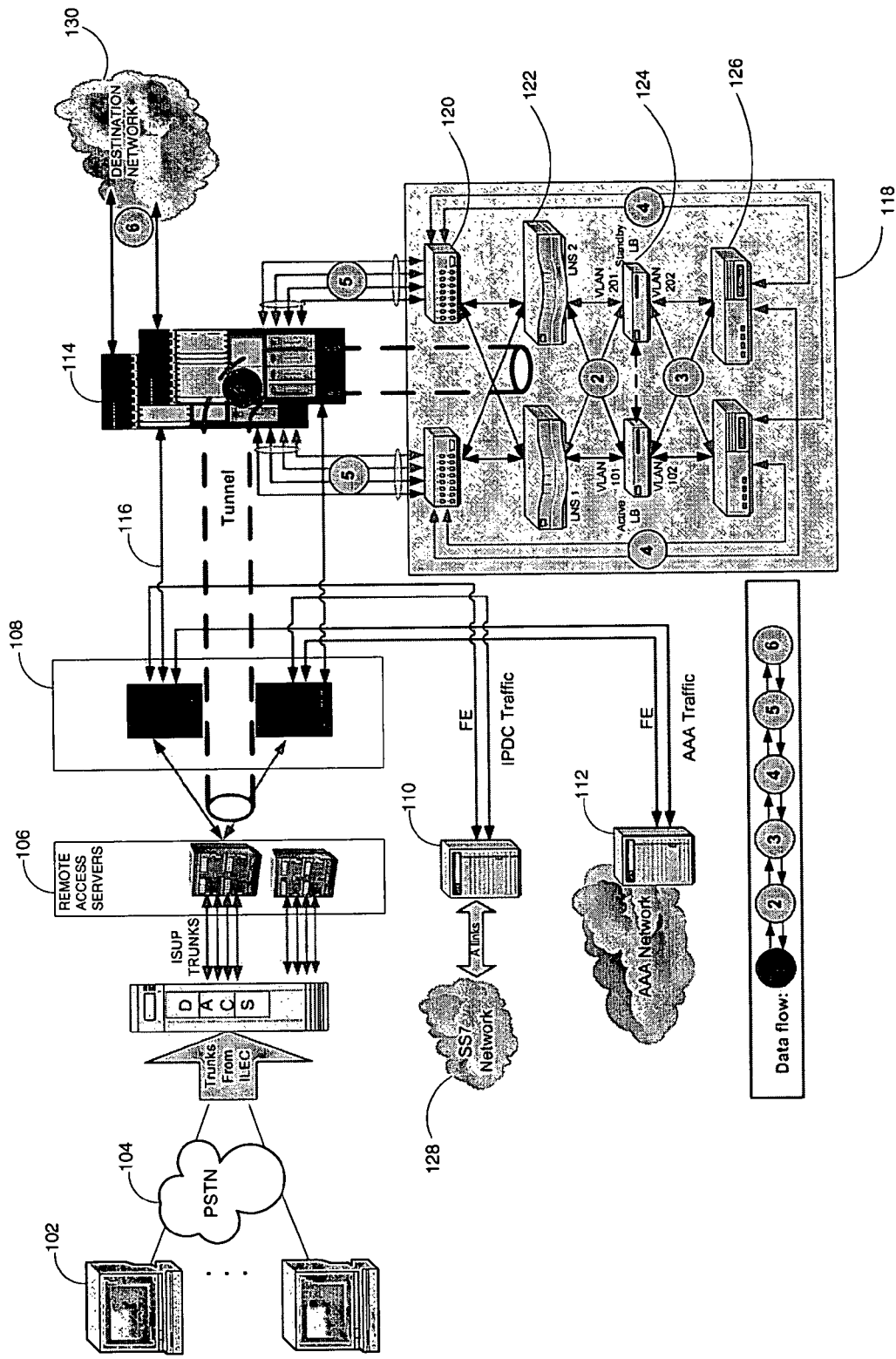
FIG. 2 illustrates an enhanced dial-up access network, according to an embodiment of the invention.

An illustrative environment in which an embodiment of the invention may operate is shown in FIG. 2, in which a set of end users 102 may communicate over the public switched telephone network 104 to a set of remote access servers 106. The set of end users may connect to the public switched telephone network 104 and the set of remote access servers 106 using, for example, dial-up modems such as modems equipped to perform ITU v.90, v.92 or other protocols. The set of end users 102 may access the public switched telephone network 104 and set of remote access servers 106 using, for example, a computer equipped with a Web browser or other hardware or software and communicating data packets using the Internet Protocol (IP) or other protocols or standards. The set of remote access servers 106 may be, include or interface to commercially available RAS platforms such as the Lucent Technologies Inc. APX™ 8000s, or other hardware, software or other resources. The set of remote access servers may interface to the public Signaling System 7 network 128 via signaling switch 110, for instance to provide call setup and call information relevant to the packet switched data network. Upon receipt of an inbound modem call, the set of remote access servers 106 may likewise communicate with an authentication server 112 to authenticate the user or account initiating the call, to authorize access to Web or other service.

The set of remote access servers 106 may likewise route traffic to a set of switches 108. The set of switches 108 may be, include or interface to commercially available switch hardware such as the Cisco Systems Inc. Catalyst™ 6509, or other hardware, software or other resources. The set of switches 108 may in turn route traffic to a set of access concentration routers 114 which coordinate and route traffic to and from the set of end users 102, a group of enhancement resources described herein, and a destination network 130 such as the Internet or other networks or sites.

More specifically, the set of remote access servers 106 may receive IP datagrams from the set of end users 102, such as requests to view Web sites, email access, and other data, and communicate that data to concentration routers 114 for routing to processing by an enhancement cluster 118. In embodiments, the set of remote access servers 106 may establish a secure virtual connection or tunnel 116 connecting the set of remote access servers 106, the set of switches 108, the access concentration routers 114 and that enhancement cluster 118.

Figure 3:
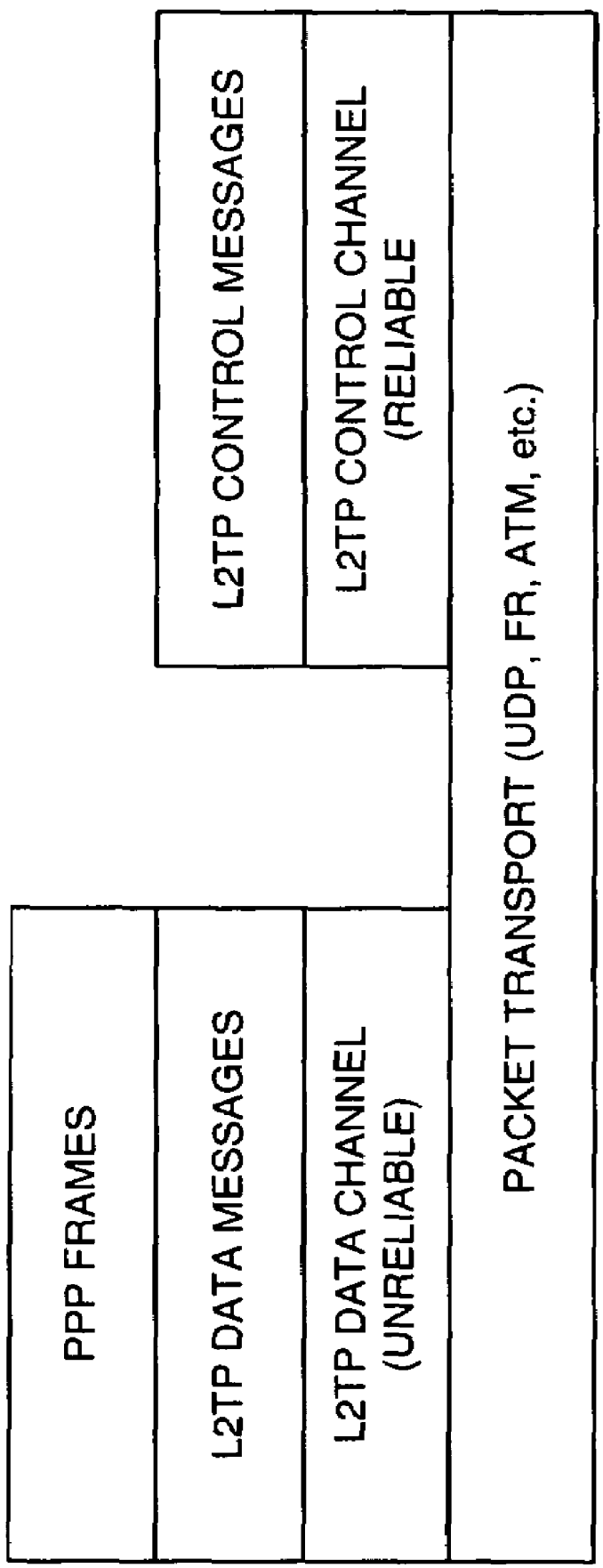
FIG. 3 illustrates a logical diagram of data transport according to a tunneling protocol.

In embodiments, the tunnel 116 may be or include a connection established using a tunneling protocol 136 such as the Layer 2 Tunneling Protocol (L2TP), known to persons skilled in the art, and an illustration of whose logical configuration is shown in FIG. 3. FIG. 4 further illustrates a datagram including header generated according to L2TP standards, including fields or flags for type (T, data or control), length (L), sequence (S), offset (O), priority (P), version (Ver), message length (Length), session ID, sequence number for data or control message (Ns), next sequence number (Nr) and offset size (indicating payload start). As shown FIGS. 3 and 4, L2TP as an operative tunneling protocol 136 may encapsulate IP, PPP or other data in a higher-lever datagram intended for delivery via virtual or other networks or connections. Those objects may be formatted to L2TP standards as promulgated by the Internet Engineering Task Force (IETF), or according to other formats or standards known by persons skilled in the art. According to the invention in another regard, the tunnel 116 may employ security features such as the IP Security (IPsec) protocol, and establish or include connections via the Universal Datagram Protocol (UDP) or other formats or channels.

According to the invention in one regard, therefore, users among the set of end users 102 may initiate a dial-up session to the set of remote access servers 106, using a browser and IP connections, or other clients and connection configurations, and directed through tunnel 116 using tunneling protocol 136.

In general, unenhanced IP communications send data packets into the network on a connectionless basis, so that datagrams traverse any available route to the destination, based for instance on least-latency or other rules. However, according to the invention in one regard the user may dial in to the set of remote access servers 106, for instance a private Internet provider dial site, which may sense the call as being designated for enhanced service and direct the transport to PPP-compatible links. For example, the authentication servers 112 may detect an enhanced call through the use of a special domain name or extension. That domain name or extension may for example take the form "Enhanced.Sprint.com" or other. The set of authentication servers 112 may interpret that target domain as a request to access enhanced throughput, storage or other services. In embodiments, the dialer, browser or other client or other software being used by the user may attempt to establish a PPP session to directly connect to the desired Web site.

However, according to the invention that modem call may be directed by the set of remote access servers 106 to tunnel 116 and ultimately to the enhancement cluster 118, based on the destination address or other identifier. The enhancement cluster 118 may perform compression, concentration, caching, optimization, and security and other functions on the user's data stream. Enhancement cluster 118 may likewise connect the user's session to or via the Internet using the underlying IP or other protocols. Since the user's data packets travel on a directed route through tunnel 116 from the set of remote access servers 106, set of switches 108, set of access concentration routers 114 and to enhancement cluster 118, that cluster may apply bidirectional compression/decompression, caching or other enhancements to the Internet or other session, resulting in a more responsive feel to the user. In general, the compression or other enhancement should or must occur in the data path so that enhancement can be performed on both upstream and downstream data flows.

In embodiments, the user's data packet, which may have originated in PPP or other format, may traverse the tunnel 116 assuming that the connection to enhancement cluster 118 is direct, when in fact the connection may be indirect or otherwise. However, because the user's data stream is spoofed or made to believe or behave as though it were direct, the non-symmetric, hybrid telephone/computer network along which traffic is flowing may convey data types which assume a symmetric connection, such as PPP or other protocols. Thus, access to enhanced Web sites and other destinations may be provided to any number of users, discriminated on destination domains and without the necessity for dedicated trunks to service the point-to-point traffic of individual providers.

When data from the user's session arrives at the enhancement cluster 118, that data may be routed and processed to perform a variety of enhancements may be performed on that data. As illustrated in FIG. 2, the traffic may be communicated via tunnel 116 to the enhancement cluster 118 and received in a set of load balancers 124 which distribute data within enhancement cluster 118. The set of load balancers 124 may communicate the user's data stream to a set of compression servers 126. The set of compression servers 126 may compress the data stream, for instance using software, hardware or other compression techniques, for example at ratios of up to 5:1 or more depending on factors such as compression type and the data being subjected to compression.

The set of compression servers 126 may also perform other or further processing, such as the caching of a user's frequented pages or other locations for faster access. The set of compression servers 126 may perform other services or enhancements as well, such as encryption or other security or other processing. Individual users may have different types of enhancement applied to their sessions or accounts, depending for instance on user selection, user subscription type or level, or other factors.

Once the set of compression servers 126 have processed the arriving or departing data stream, that data may be communicated back to the set of load balancers 124, and then to a set of cluster switches 120. The traffic switched by the set of cluster switches 120 may then be communicated to the set of access concentration routers 114, which may route the session to the destination network 130 such as the Internet or other network, for instance based on an IP address or other addressing scheme. Data flowing back from destination network 130 may traverse the set of access concentration routers 114 and be routed to the enhancement cluster 118, where compression, caching, optimization, and security or other services may be applied before the data returns via tunnel 116 to the user in the set of users 102 conducting the session.

Figure 5:
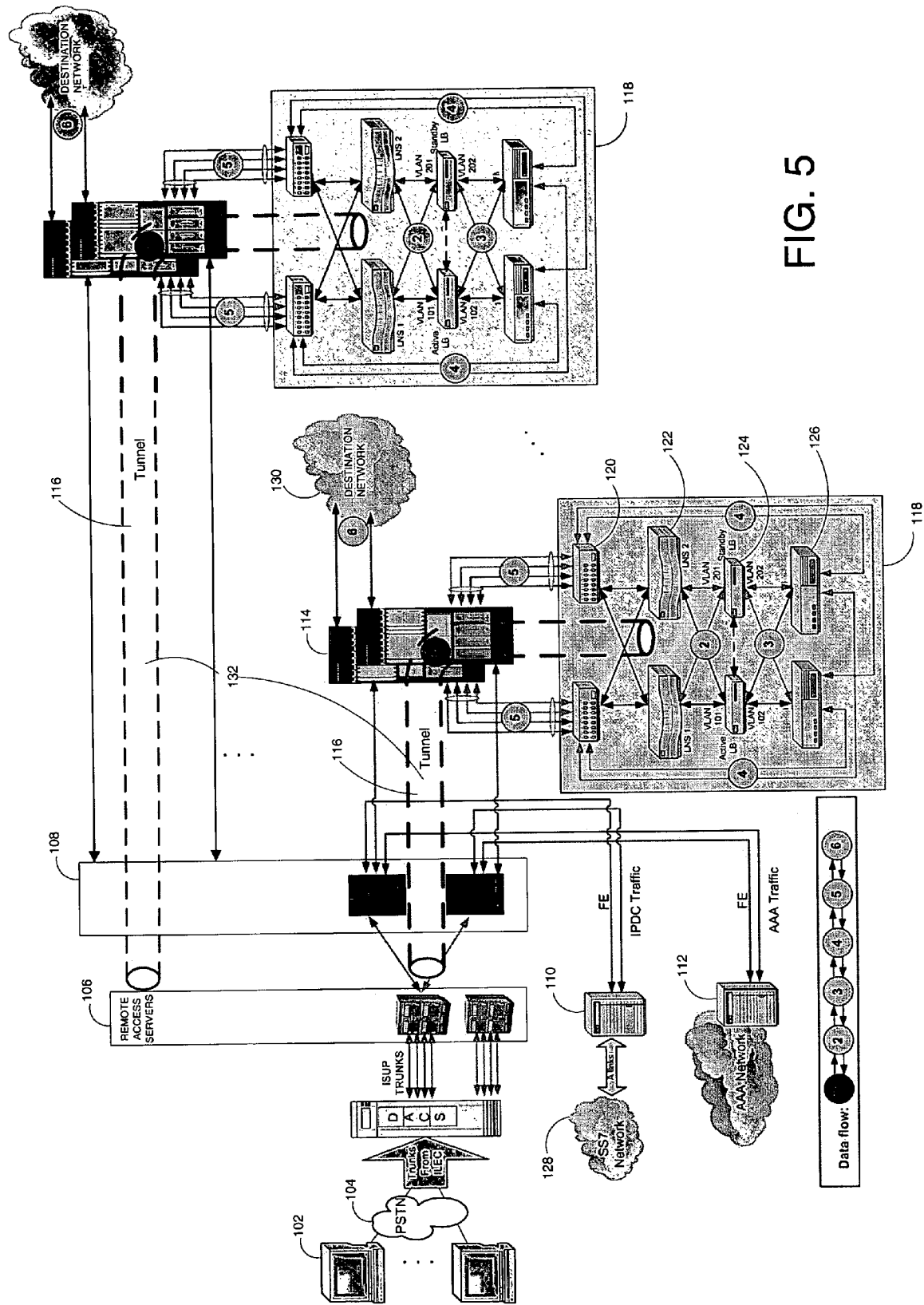
FIG. 5 illustrates an enhanced dial-up access network, according to another embodiment of the invention.

FIG. 5 illustrates an embodiment of the invention, in which incoming modem calls from the set of users likewise terminate in the set of remote access servers 106 for Internet or other access. In the illustrated embodiment, compression, caching, security and other features are however delivered by a set of distributed enhancement platforms 134 via set of tunnels 132, which platforms may be logically or physically separated from each other or other parts of the network. For example, according to embodiments of this type in one regard, various ones or more of the set of distributed enhancement platforms 134 may be hosted by or located at different physical locations, such as on the premises of individual Internet service providers. Different ones of more of distributed enhancement platforms 134 may supply different types of data stream enhancements, depending on the provider or the user's account or subscription.

Figure 6:
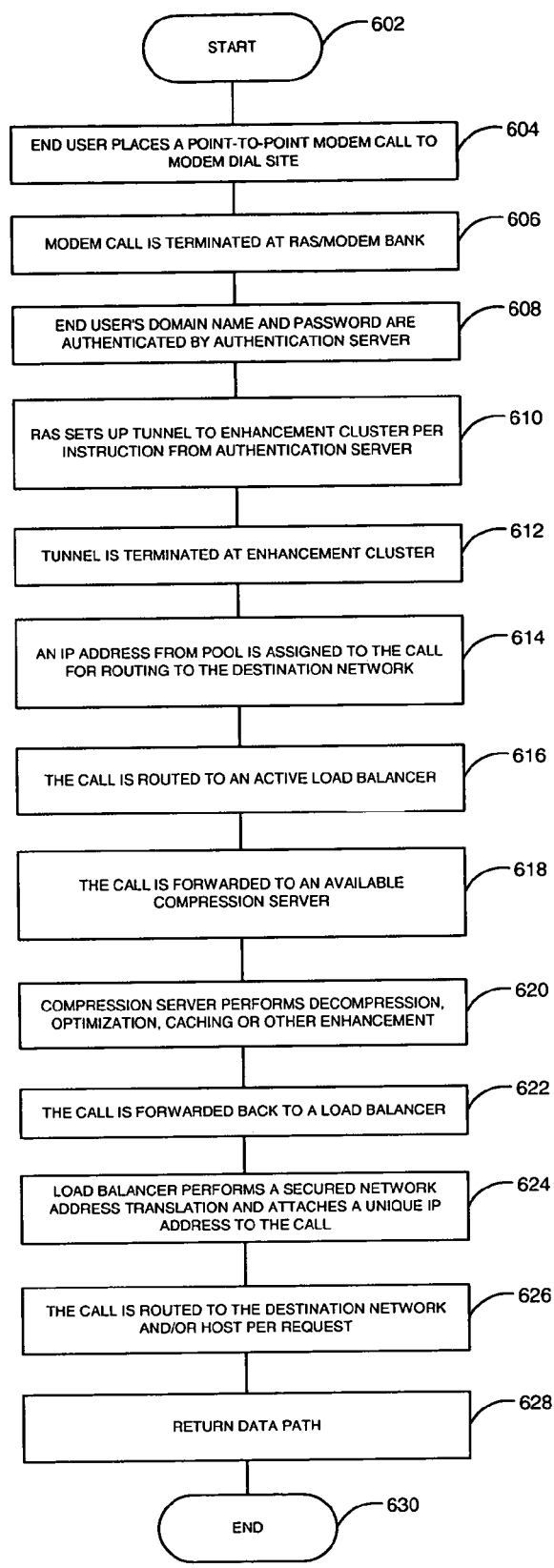
FIG. 6 illustrates overall connection processing, according to an embodiment of the invention.

Overall connection processing according to an embodiment of the invention is illustrated in FIG. 6. In step 602, processing begins. In step 604, a user among the set of end users 102 or otherwise may place a point-to-point call to an IP dial site, such as a modem call via the public switched telephone network 104 to a telephone number assigned to an Internet service provider. In step 606, the call may be terminated at the set of remote access servers 106 or otherwise. In step 608, the domain name, password or other information supplied by the end user may be authenticated via authentication server 112. In step 610, the set of remote access servers 106 may generate a tunnel 116 to the enhancement cluster 118 after authentication by authentication server 112, such as for example a L2TP or other tunnel or connection.

In step 612, the tunnel 116 may be terminated at the enhancement cluster 118, for instance at the set of tunnel servers 122, such as L2TP Network Servers (LNS) or other platforms. In step 614, a temporary IP address may be assigned to the ongoing call for routing to the Internet or other destination. In step 616, the call or session may be routed to one of the set of load balancers 124. In step 618, the call may be routed to one of the set of compression servers 126. In step 620, the one of the compression servers 126 may perform compression, caching, encryption or other security or other processing on the data stream of the call.

In step 622, the call may be forwarded back to one of the set of load balancers 124. In step 624, the one of the set of load balancers 124 may perform a secured network address translation (NAT) and attach or substitute a unique IP address to the call. In step 626, the call may be routed via the set of access concentration routers 114 to destination network 130 or other destination. In step 628, the Web site or other destination may return data to the end user via enhancement cluster 118 and tunnel 116, performing for instance corresponding decryption, caching or other processing on the return data stream. In step 630, processing may end, repeat, or return to a prior point.

The foregoing description of the invention is illustrative, and modifications in configuration and implementation will occur to persons skilled in the art. For instance, while the invention has generally been described in terms of channeling inbound modem calls to one or more enhancement clusters via the exemplary L2TP protocol as one tunnel protocol 136, other protocols or channels, such as Layer 3 Tunneling Protocol (L3TP), or other certificate-based or other standards-based or proprietary connections may be used. Similarly while the invention has generally been illustrated in terms of the set of end users 102 being or including consumers accessing Internet service providers, other users and other providers may employ platforms according to the invention, such as corporate, government or other employees accessing private networks, storage or other resources via an authenticated tunnel connection.

For further example, while the invention has in embodiments been illustratively described as discriminating or directing end users to the enhancement cluster based on the destination domain name, in embodiments other criteria or mechanisms, such as explicit passwords, certificates, cookies or other techniques to identify enhanced service sessions, may be used. The scope of the invention is accordingly intended to be limited only by the following claims.

What is claimed is:

1. A system for generating an enhanced data, comprising:
an input interface that receives data associated with a modem-based data session established via at least one circuit-switched network communicating with at least one asymmetric-routing data network that is capable of facilitating a transfer over the at least one asymmetric-routing network of data packets that are encapsulated in a tunneling-protocol and that are associated with the modem-based data session and operable to send using the tunneling protocol for delivery via one or more virtual point-to-point connections based on a destination address associated with the tunneling-protocol-encapsulated data packets;
at least one enhancement cluster for receiving and processing the tunneling-protocol-encapsulated data packets that enhances a connection from a source to a destination network; and
at least one virtual point-to-point connection for communicating the tunneling-protocol-encapsulated data packets over at least one communications path traversing the at least one asymmetric-routing data network and operable to convey data-types that utilize a point-to-point connection, wherein the at least one communications path couples the input interface to the at least one enhancement cluster based on the destination address, and wherein the at least one virtual point-to-point connection emulates a dedicated point-to-point connection path connecting the input interface to the at least one enhancement cluster.

2. A system according to claim 1, wherein the input interface comprises a set of remote access servers.

3. A system according to claim 1, wherein the encapsulated data packets are sent using a tunneling protocol comprising a Layer 2 tunneling protocol.

4. A system according to claim 1, wherein the at least one virtual point-to-point connection comprises a plurality of virtual point-to-point connections.

5. A system according to claim 1, wherein the at least one enhancement cluster comprises a set of load balancers.

6. A system according to claim 1, wherein the at least one enhancement cluster comprises a set of compression servers.

7. A system according to claim 1, wherein the at least one enhancement cluster comprises a set of tunnel servers.

8. A system according to claim 1, wherein the at least one enhancement cluster comprises a set of distributed enhancement platforms.

9. A system according to claim 8, wherein at least two of the set of distributed enhancement platforms are operated by separate access providers.

10. A system according to claim 9, wherein the at least two of the set of distributed enhancement platforms are hosted at separate locations.

11. A system according to claim 1, wherein processing the data packets comprises at least one of applying compression, applying decompression, performing caching, applying optimization, and applying security to the data session.

12. A system according to claim 1, wherein the destination network comprises the Internet.

13. A system according to claim 1, wherein the data session originates as a point-to-point session.

14. A system according to claim 1, wherein access to the enhancement cluster is granted based on one or more of a password, certificate, and cookie.

15. A system according to claim 1, wherein access to the enhancement cluster is discriminated by at least a domain name.

16. A system according to claim 1, further comprising an interface to an authentication platform, the authentication platform authenticating the data session for access to the enhancement cluster.

17. A method for generating an enhanced data connection, the method comprising:
receiving at an at least one remote access server data associated with a modem-based data session established via at least one circuit-switched network communicating with at least one data network that facilitates asymmetric data routing; encapsulating at the at least one remote access server packets of the data to be sent in a tunneling protocol for delivery via one or more virtual point-to-point connections; communicating the tunneling-protocol-encapsulated data packets via at least one virtual point-to-point connection over at least one communications path traversing the at least one data network and operable to convey data-types that utilize a point-to-point connection, wherein the at least one communications path couples the at least one remote access server to at least one enhancement cluster based on a destination address associated with the tunneling-protocol-encapsulated data packets, and wherein the virtual point-to-point connection emulates a dedicated point-to-point connection path connecting the at least one remote access server to the at least one enhancement cluster; and
receiving and processing the tunneling-protocol-encapsulated data packets in the at least one enhancement cluster to enhance the data connection.

18. The method of claim 17, wherein the step of receiving comprises receiving the data associated with a modem-based data session in the at least one remote access server.

19. The method of claim 17, wherein the tunneling protocol comprises at least one of a Layer 2 tunneling protocol and a Layer 3 tunneling protocol.

20. The method of claim 17, wherein the at least one virtual point-to-point connection comprises a plurality of virtual point-to-point connections.

21. The method of claim 17, wherein the at least one enhancement cluster comprises a set of load balancers.

22. The method of claim 17, wherein the at least one enhancement cluster comprises a set of compression servers.

23. The method of claim 17, wherein the at least one enhancement cluster comprises a set of tunnel network servers.

24. The method of claim 17, wherein the at least one enhancement cluster comprises a set of distributed enhancement platforms.

25. The method of claim 24, wherein at least two of the set of distributed enhancement platforms are operated by separate access providers.

26. The method of claim 25, wherein the at least two of the set of distributed enhancement platforms are hosted at separate locations.

27. The method of claim 17, wherein the processing comprises at least one of applying compression, applying decompression, performing caching, applying optimization, and applying security to the data packets.

28. The method of claim 17, wherein the destination network comprises the Internet.

29. The method of claim 17, wherein the data session originates as a point-to-point session.

30. The method of claim 17, further comprising discriminating access to the enhancement cluster based on at least one of a password, certificate, and cookie.

31. The method of claim 17, further comprising discriminating the access to the enhancement cluster by at least a domain name.

32. The method of claim 17, further comprising authenticating the data session for access to the enhancement cluster.

33. A system for generating an enhanced data connection, comprising:
input interface means for receiving data associated with a modem-based data session established via at least one circuit-switched network communicating with at least one data network that facilitates asymmetric data routing;
encapsulation means for encapsulating in a tunneling protocol data packets, of the data associated with a modem-based data session, operable for sending over the data network using the tunneling protocol means for delivery via one or more virtual point-to-point connections based on a destination address associated with the tunneling-protocol-encapsulated data packets;
at least one enhancement-cluster means for receiving and processing the tunneling-protocol-encapsulated data packets to enhance a connection from a source to a destination network; and
at least one virtual point-to-point connecting means for communicating the tunneling-protocol-encapsulated data packets over at least one communications path traversing the at least one data network and operable to convey data-types that utilize a point-to-point connection, wherein the at least one communications path couples the input interface to the at least one enhancement cluster based on the destination address, and wherein the at least one virtual point-to-point connecting means includes a means for emulating a dedicated point-to-point connection path connecting the input interface to the at least one enhancement cluster.

34. A system according to claim 33, wherein the at least one enhancement cluster means comprises a set of compression server means.

35. A system according to claim 33, wherein the at least one enhancement cluster means comprises a set of distributed enhancement platform means.

36. A system according to claim 35, wherein at least two of the set of distributed enhancement platform means are operated by separate access providers.

37. A system according to claim 33, wherein the means for processing the data packets comprises at least one of applying compression, applying decompression, performing caching, applying optimization, and applying security to the data session.

38. A system according to claim 33, wherein the destination network comprises the Internet.

39. A system according to claim 33, wherein the data session originates as a point-to-point session.

40. A system according to claim 33, wherein access to the enhancement cluster means is granted based on one or more of a password, certificate, cookie and domain name.

41. An enhanced data session, the enhanced data session being generated by a method comprising:
receiving at an at least one remote access server data associated with a modem-based data session established via at least a circuit-switched network communicating with at least one asymmetrically-routed data network;

encapsulating at the at least one remote access server packets of the data to be sent in a tunneling protocol for delivery via one or more virtual point-to-point connections;

communicating the tunneling-protocol-encapsulated data packets via at least one virtual point-to-point connection over at least one communications path operable to convey data-types that utilize a point-to-point connection and traversing the at least one data network that facilitates asymmetric data routing, wherein the at least one communications path couples the at least one remote access server to at least one enhancement cluster based on a destination address associated with the tunneling-protocol-encapsulated data packets, and wherein the virtual point-to-point connection emulates a dedicated point-to-point connection path connecting the at least one remote access server to the at least one enhancement cluster; and receiving and processing the tunneling-protocol-encapsulated data packets to generate an enhanced session in the at least one enhancement cluster, the enhanced session connecting to a destination network.

42. An enhanced data session according to claim 41, wherein the at least one enhancement cluster comprises a set of compression servers.

43. An enhanced data session according to claim 41, wherein the at least one enhancement clusters comprises a set of distributed enhancement platforms.

44. An enhanced data session according to claim 43, wherein at least two of the set of distributed enhancement platforms are operated by separate access providers.

45. An enhanced data session according to claim 41, wherein the processing comprises at least one of applying compression, applying decompression, performing caching, applying optimization, and applying security to the data session.

46. An enhanced data session according to claim 41, wherein the destination network comprises the Internet.

47. An enhanced data session according to claim 41, wherein the data session originates as a point-to-point session.

48. An enhanced data session according to claim 41, wherein access to the enhancement cluster is granted based on one or more of a password, certificate, cookie and a domain name.

49. A method for generating an enhanced data connection, the method comprising: receiving at an at least one remote access server data packets that form a part of a modem-based data session; encapsulating at the at least one remote access server the data packets to be sent in a tunneling protocol for delivery via one or more virtual point-to-point connections;

communicating the tunneling-protocol-encapsulated data packets via at least one virtual point-to-point connection over at least one communications path traversing an asymmetric data network and operable to convey data-types that utilize a point-to-point connection, wherein the at least one communications path couples the at least one remote access server to at least one enhancement cluster based on a destination address associated with the tunneling-protocol-encapsulated data packets, and wherein the virtual point-to-point connection emulates a dedicated point-to-point connection path connecting the at least one remote access server to the at least one enhancement cluster; and receiving and processing the tunneling-protocol-encapsulated data packets in the at least one enhancement cluster to enhance the data connection.

50. The method of claim 49, wherein the processing comprises at least one of applying compression, applying decompression, performing caching, applying optimization, and applying security to the data session.

51. The method of claim 49, wherein the destination network comprises the Internet.

52. The method of claim 49, wherein the data session originates as a point-to-point session.

53. The method of claim 49, wherein the tunneling protocol comprises at least one of a Layer 2 tunneling protocol and a Layer 3 tunneling protocol.

54. The method of claim 49, wherein the at least one enhancement cluster comprises a set of distributed enhancement platforms.

55. The method of claim 54, wherein at least two of the enhancement platforms of the set of distributed enhancement platforms are hosted at separate locations.

* * * * *

UNITED STATES PATENT AND TRADEMARK OFFICE
CERTIFICATE OF CORRECTION

PATENT NO. : 7,616,625 B1
APPLICATION NO. : 10/689690
DATED : November 10, 2009
INVENTOR(S) : Un et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1132 days.

Signed and Sealed this

Nineteenth Day of October, 2010

David J. Kappos
*Director of the United States Patent and Trademark Office*